United States Patent
Kelleher

(10) Patent No.: US 7,530,527 B2
(45) Date of Patent: May 12, 2009

(54) METHOD AND DEVICE FOR LAUNCHING AERIAL VEHICLES

(75) Inventor: Christopher Charles Kelleher, Farnborough (GB)

(73) Assignee: Qinetiq Limited (GB)

( * ) Notice: Subject to any disclaimer, the term of this patent is extended or adjusted under 35 U.S.C. 154(b) by 335 days.

(21) Appl. No.: 10/558,312

(22) PCT Filed: May 20, 2004

(86) PCT No.: PCT/GB2004/002209

§ 371 (c)(1),
(2), (4) Date: Nov. 22, 2005

(87) PCT Pub. No.: WO2004/106156

PCT Pub. Date: Dec. 9, 2004

(65) Prior Publication Data

US 2006/0278757 A1  Dec. 14, 2006

(30) Foreign Application Priority Data

May 30, 2003  (GB) ................... 0312353.6

(51) Int. Cl.
*B64D 5/00* (2006.01)
*B64F 1/04* (2006.01)
(52) U.S. Cl. ........................................ 244/2; 244/63
(58) Field of Classification Search ............ 244/31
See application file for complete search history.

(56) References Cited

U.S. PATENT DOCUMENTS

| | | | | |
|---|---|---|---|---|
| 893,647 A | * | 7/1908 | Pennington | 244/63 |
| 1,546,803 A | * | 7/1925 | Sternberg | 244/2 |
| 1,704,968 A | * | 3/1929 | Gale | 244/63 |
| 1,716,670 A | * | 6/1929 | Sperry | 244/2 |
| 1,732,524 A | * | 10/1929 | McDonald | 244/63 |
| 1,748,663 A | * | 2/1930 | Tucker | 244/63 |
| 1,791,655 A | * | 2/1931 | Bisch | 104/23.1 |
| 1,792,738 A | * | 2/1931 | Hall | 244/2 |
| 1,869,506 A | * | 8/1932 | Richardson | 244/2 |
| 1,887,860 A | * | 11/1932 | Powelson et al. | 244/63 |
| 1,912,722 A | * | 6/1933 | Perkins | 244/2 |
| 1,949,304 A | * | 2/1934 | Hardin | 244/2 |
| 2,365,827 A | * | 12/1944 | Liebert | 244/2 |
| 2,402,879 A | * | 6/1946 | Du Pont | 258/1.2 |
| 2,922,602 A | * | 1/1960 | Matheisel et al. | 244/63 |
| 3,015,456 A | * | 1/1962 | Deisinger | 244/2 |

(Continued)

FOREIGN PATENT DOCUMENTS

DE  199 50 828  7/2000

(Continued)

*Primary Examiner*—Michael R Mansen
*Assistant Examiner*—Joseph W Sanderson
(74) *Attorney, Agent, or Firm*—McDonnell Boehnen Hulbert & Berghoff LLP

(57) ABSTRACT

A heavier-than-air air vehicle, particularly a long endurance, solar powered, unmanned aerial vehicle (UAV) intended for "perpetual" flight within the stratosphere, is carried to its operational altitude suspended on a tether from a helium balloon. The tether is attached at or towards a tip of the UAV's wing so that it is carried in effectively a 90° banked attitude. At the desired altitude the UAV's powerplant is started and it flies on its tether in an upwardly-spiralling path relative to the balloon until a level or near level attitude is attained, when the tether is released and the UAV is permitted to assume free flight.

17 Claims, 4 Drawing Sheets

U.S. PATENT DOCUMENTS

| | | | | |
|---|---|---|---|---|
| 3,017,138 A | * | 1/1962 | Flint | 244/3 |
| 4,365,772 A | * | 12/1982 | Ferguson | 244/33 |
| 4,601,444 A | * | 7/1986 | Lindenbaum | 244/26 |
| 4,695,012 A | * | 9/1987 | Lindenbaum | 244/26 |
| 4,697,761 A | | 10/1987 | Long | |
| 4,757,959 A | * | 7/1988 | Schroder et al. | 244/2 |
| 4,995,572 A | * | 2/1991 | Piasecki | 244/2 |
| 5,074,489 A | * | 12/1991 | Gamzon | 244/2 |
| 5,150,860 A | * | 9/1992 | Young | 244/63 |
| 5,470,033 A | * | 11/1995 | Tsai et al. | 244/100 E |
| 5,626,310 A | * | 5/1997 | Kelly | 244/2 |
| 5,810,284 A | | 9/1998 | Hibbs et al. | |
| 5,850,989 A | * | 12/1998 | Trudeau et al. | 244/63 |
| 6,402,090 B1 | * | 6/2002 | Aaron | 244/24 |
| 6,705,573 B2 | * | 3/2004 | McDonnell | 244/170 |
| 6,874,729 B1 | * | 4/2005 | McDonnell | 244/63 |
| 7,059,564 B2 | * | 6/2006 | Dennis | 244/110 F |
| 7,073,749 B2 | * | 7/2006 | Krill et al. | 244/2 |
| 7,131,613 B2 | * | 11/2006 | Kelly | 244/171.4 |
| 2001/0025900 A1 | * | 10/2001 | Kramer | 244/2 |

FOREIGN PATENT DOCUMENTS

| | | | |
|---|---|---|---|
| EP | 0 385 921 | | 9/1990 |
| EP | 1 063 165 | | 12/2000 |
| GB | 2 362 145 | | 11/2001 |
| JP | 2000-187081 | | 7/2000 |
| JP | 2003090699 A | * | 3/2003 |
| WO | WO 00/34122 | | 6/2000 |
| WO | WO 01/58756 | | 8/2001 |
| WO | WO 01/58757 | | 8/2001 |
| WO | WO 01/58758 | | 8/2001 |

* cited by examiner

METHOD AND DEVICE FOR LAUNCHING AERIAL VEHICLES

BACKGROUND OF THE INVENTION (1) Field of the Invention

The present invention relates to the launching of aerial vehicles and is more particularly (though not exclusively) concerned with the launching of high altitude, long endurance, solar powered, winged, unmanned aerial vehicles (UAVs).

(2) Description of the Art

Solar powered UAVs have been proposed for use as long endurance aerial platforms, flying at stratospheric altitudes (typically between 15,000 and 30,000 m), for such roles as communications relay, earth observation, weather monitoring, surveillance and mapping. In this respect they may provide a cost-effective alternative to the earth-orbital satellites conventionally used for these purposes and have the additional advantage that they can be easily controlled to remain in sight of a selected part of the globe or to fly to any other selected station. Such vehicles comprise a lightweight structure including at least one aerodynamic lifting surface (wing), one or more electrically-driven thrust-producing motors, an array of photovoltaic cells, and electric storage means such as rechargeable batteries or regenerative fuel cells. An example of such a vehicle is described in U.S. Pat. No. 5,810,284, WO 01/58756, WO 01/58757 and WO 01/58758. In principle vehicles of this kind can remain aloft indefinitely, limited only by the reliability of their mechanical components and airframe .integrity, by following a diurnal flight pattern in which, during the hours of daylight, the power generated by the photovoltaic cells is used to drive the motors at high power to climb the vehicle from a base operational altitude to a higher operational altitude and to charge the electric storage means, and during the hours of darkness the motors are driven at lower power from the storage means and the vehicle is allowed to descend to the base (though still stratospheric) operational altitude.

Atmospheric conditions within the stratosphere are generally benign, meaning that an airframe designed to fly only within the stratosphere can be less robust, and hence lighter, than one designed to fly within the variable atmospheric conditions of the troposphere. Furthermore the minimisation of airframe weight is of especial importance to the success of a long endurance vehicle whose power supply is limited to the electricity which can be generated from onboard photovoltaic calls during daylight.

The conventional method by which a high altitude, solar powered UAV is initially launched to its operational altitude—such as the one described in U.S. Pat. No. 5,810,284 et al —is for it to climb under its own power from the ground. This implies, however, that the airframe must be sufficiently strong (and therefore heavy) to cope with the additional loads imposed by flight through turbulent regions of the troposphere (hence imposing an undesirable limitation on the payload which it can carry) and/or that it will risk airframe damage during the climb and/or that its launch must await the most favourable weather conditions.

U.S. Pat. No. 4,697,761 discloses an alternative method of launching a solar powered UAV in which it is carried aloft, suspended in a 90° banked attitude, inside the envelope of a lighter-than-air balloon. When a desired altitude is reached the lower end of the balloon is unreefed and, after a brief delay, the UAV is released and free falls from the balloon before assuming level flight under its own power. No details are provided of aerodynamic control required to transition from the free fall 90° banked attitude to level flight. It is likely, however, that significant loads would be imposed upon the airframe in recovering from the drop from the balloon, meaning again that it must be stronger (and therefore heavier) than that required for normal stratospheric flight.

SUMMARY OF THE INVENTION

It is one aim of the invention to avoid the above-described drawbacks of prior art launching methods and accordingly in one aspect the invention resides in a method of launching a heavier-than-air air vehicle comprising at least an aerodynamic lifting surface and thrust-producing powerplant, the method comprising: raising the heavier-than-air vehicle to a desired altitude by means of a lighter-than-air vehicle; when said desired altitude has been reached, operating said powerplant to produce thrust with the heavier-than-air vehicle suspended from the lighter-than-air vehicle by means of a tether attached to the heavier-then-air vehicle at or towards an extremity of said lifting surface, whereby to cause the tethered heavier-than-air vehicle to describe an upwardly-spiralling path relative to the lighter-than-air vehicle; and releasing said tether to permit free flight of the heavier-than-air vehicle when the latter has reached a desired attitude.

The method according to the invention is particularly applicable to the launching to stratospheric altitude of a long endurance, solar powered UAV and obviates the need to design the airframe of the latter for flight under its own power through the troposphere or to withstand a free fall, unusual attitude release from the lighter-than-air vehicle.

The invention also resides in the combination of a heavier-than-air air vehicle comprising at least an aerodynamic lifting surface and thrust-producing powerplant; a lighter-than-air vehicle adapted to lift the heavier-than-air vehicle; a tether attachable to the heavier-than-air vehicle at or towards an extremity of said lifting surface, for suspending the heavier-than-air vehicle from the lighter-than-air vehicle; and control means; all constructed and arranged so as to execute the foregoing method.

The invention also resides in a solar powered, unmanned heavier-than-air air vehicle adapted to be launched by a method as defined above, said vehicle comprising at least an aerodynamic lifting surface and a thrust-producing powerplant, the structure of said lifting surface incorporating means at or towards an extremity thereof for attachment to a tether for launch of the vehicle as aforesaid.

DESCRIPTION OF THE FIGURES

These and other aspects of the present invention will now be more particularly described, by way of example, with reference to the accompanying drawings, in which.

DETAILED DESCRIPTION OF THE INVENTION

Figure 1:
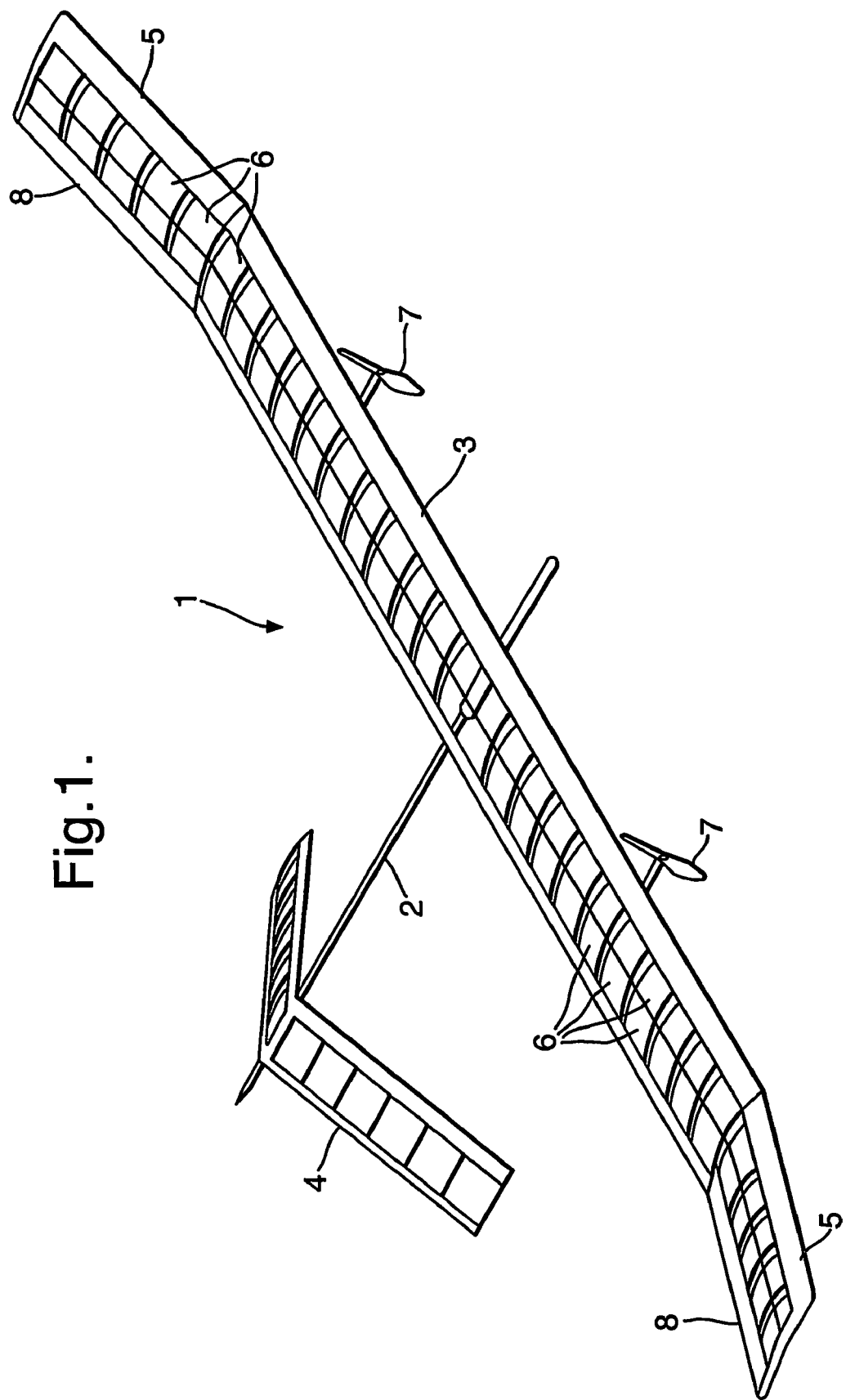
FIG. 1 is a pictorial view of one embodiment of a high altitude, long endurance, solar powered UAV which may be launched by a method according to the invention.

Referring to FIG. 1, the illustrated UAV 1 comprises a tubular fuselage 2 with a mainplane 3 and an inverted V tail 4, (although in other embodiments a more conventional empennage may be employed). The mainplane 3 has dihedral tip sections 5 and substantially the whole of its upper surface carries arrays of photovoltaic cells 6, or such cells may be housed within the mainplane structure beneath a transparent upper skin. Its powerplant comprises a pair of wing-mounted brushless DC electric motors (not seen) driving propellers 7, although other embodiments may comprise a different number of such powerplant depending on the size of airframe and motor rating. Housed within the mainplane structure are a plurality of regenerative fuel cells or rechargeable batteries.

In use of the UAV, having been launched to a desired stratospheric altitude, power is supplied by the photovoltaic cell arrays 6 to its motors and to charge the onboard fuel cells or batteries during the hours of daylight, and power stored by the fuel cells/batteries is supplied to the motors during the hours of darkness. In this way the vehicle is capable of "perpetual" flight in accordance with known principles.

The airframe weight is minimised, the fuselage 2 and wing and tail spars and ribs being constructed of carbon composite, leading edge mouldings of a high performance rigid foam material such as Rohacell®, and the wing and tail surfaces a Mylar® skin. Roll control is provided by ailerons 8 and the tail 4 is all-moving to provide pitch and yaw control; that is to say each plane of the tail 4 is rotatably mounted to the fuselage 2 by a respective spar and they can be turned in unison to function as an elevator (pitch control) and differentially to function as a rudder (yaw control).

Control of the vehicle's flying controls, powerplant, payload equipment and the tether release to be described below can be exercised via a radio link from the ground or via satellite to a remote ground station and/or by an onboard computer. Its payload can be carried in the region of the fuselage/wing root junction or distributed in multiple modules across the wing 3 and will comprise such communications, monitoring or other equipment as may be appropriate for its operational role, examples of which are mentioned in the introduction.

Turning now to FIGS. 2 to 5 these illustrate successive stages in the launch procedure for the vehicle.

Figure 2:
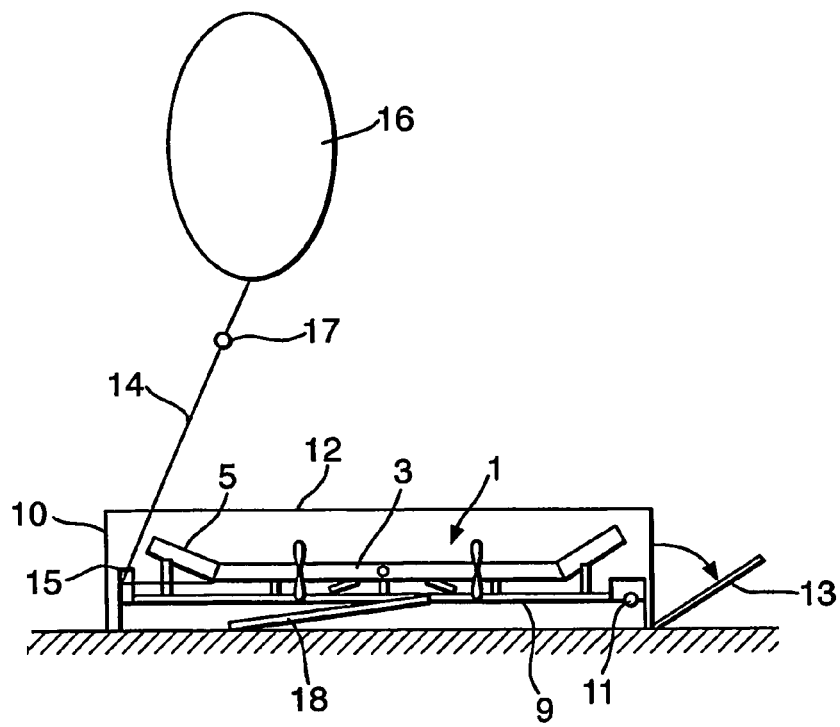
FIGS. 2 to 5 are schematic diagrams, not to scale, illustrating successive stages in the launching to high altitude of the UAV of FIG. 1.

With reference to FIG. 2, the UAV 1 is transported to the launch site clamped horizontally onto a spanwise beam 9 within a container 10. The beam 9 is pivoted to the container 10 at one end as indicated at 11. At the launch site the top 12 of the container is removed and its end 13 adjacent to the pivot 11 is opened. A tether 14 from a helium balloon envelope is attached first to the end 15 of the beam 9 opposite to the pivot 11 and thence to the spar of the mainplane 3 of the UAV at the adjacent outermost end of its centre section, before the tip section 5. The balloon is inflated and rises as indicated at 16 in the Figure. The balloon may be of a generally conventional type as used for example in weather monitoring or scientific ballooning and has a design float altitude with payload (in this case the UAV 1) in the region of 20,000-30,000 m. It is equipped with a vent valve and a quantity of ballast (not shown) the release of which can be controlled via a radio link and/or by an onboard computer. A mass 17 is included in the tether 14 for a reason which will be described later. It is noted that for ease of illustration the balloon 16 is shown much reduced in scale from its actual relative size to the UAV 1 and the tether 14 is likewise shown much shorter. In practice the tether may be in the region of 200-400 m in length. Similarly, the displaced angle of the tether 14 under the influence of wind on the balloon 16 is exaggerated in FIGS. 2 and 3 from that which is likely to obtain in practice.

Figure 3:
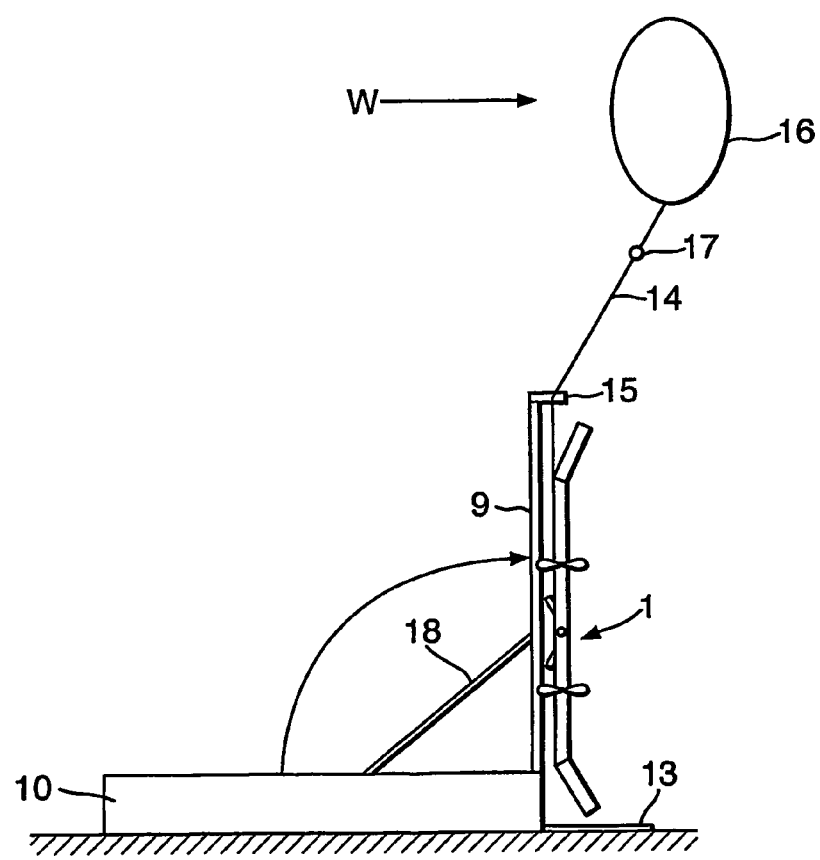

The lift of the balloon 16 on the beam 9, aided by jacks 18 beneath the beam, causes the beam to turn about its pivot until it reaches the vertical condition illustrated in FIG. 3. In this condition the clamps from the beam to the UAV 1 are released and the UAV is suspended on the tether 14 from the end 15 of the beam effectively in a 90° banked attitude. The tether 14 is then released from the beam 9 and the balloon 16 lifts the UAV up and away from the beam. The container 10 will have been orientated originally with the beam end 15 into wind (the direction of which is indicated by the arrow W in FIG. 3) so there is no risk of the UAV colliding with the beam during this part of the launch procedure.

Figure 4:
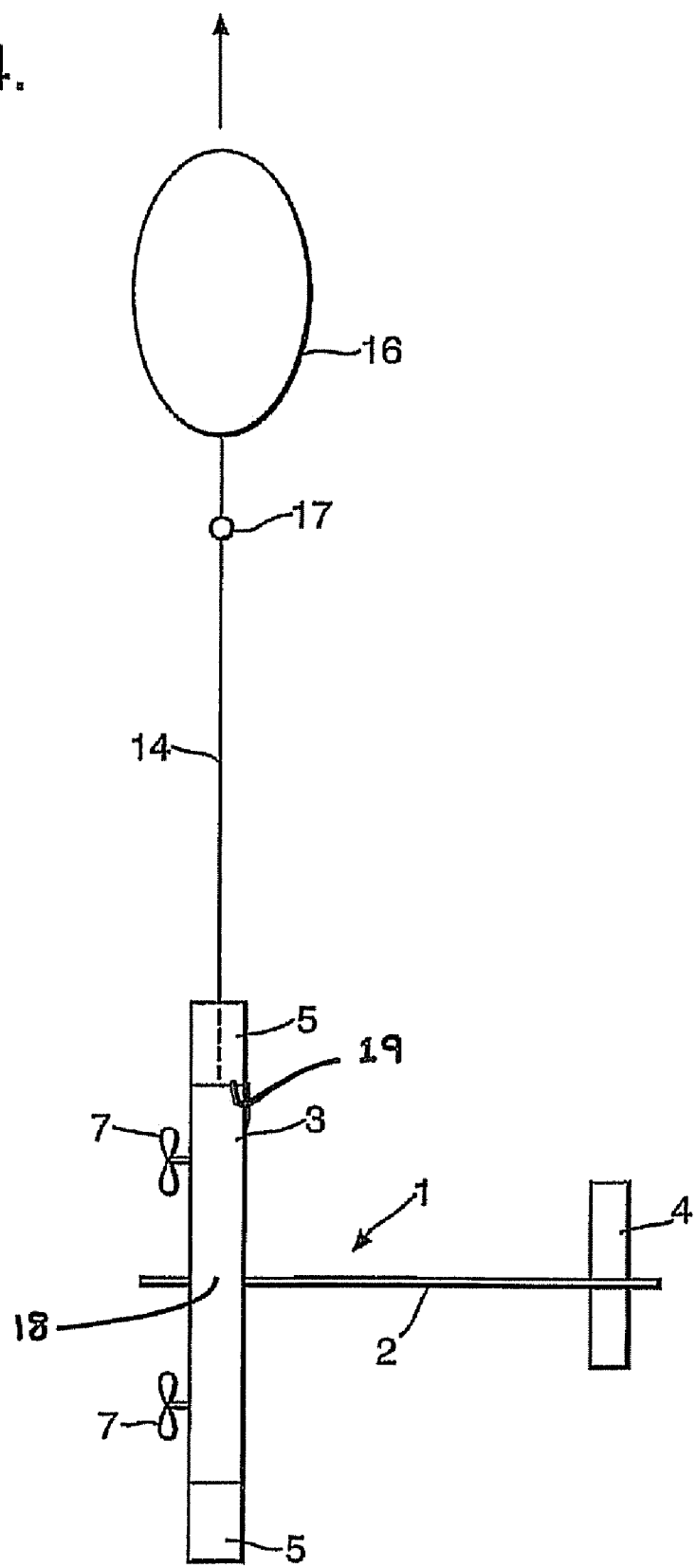
Figure 5:
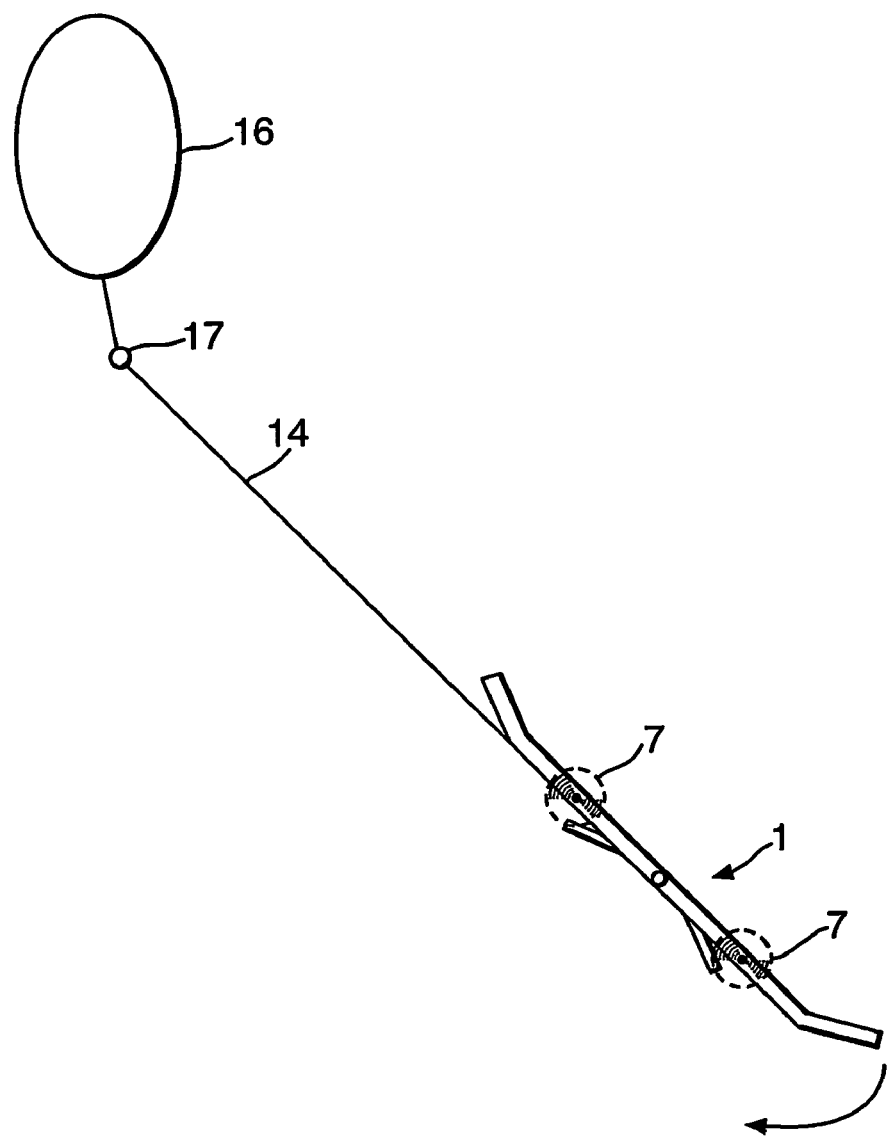

The balloon 16 ascends to a desired stratospheric altitude carrying the UAV 1 beneath it on the tether 14 in the same attitude as that from which it was released from the beam 9, as indicated in FIG. 4. At the top of the ascent, power is switched to the UAV's motors and its tail 4 is placed in a "down elevator" position. The combined effect is that the UAV commences to describe an arcuate path (conical pendulum motion) about the point of connection of the tether 14 to the mass 17, with the upper surface of the wing 3 facing outwards. When a stable motion has been achieved, the elevator is set to neutral and the power is increased. As the speed of the UAV increases, the radius of its path increases, and the lift which it generates increases, so that the tethered UAV describes an upwardly-spiralling path relative to the balloon, with its bank angle correspondingly reducing. FIG. 5 indicates the disposition of the two vehicles at one point during the upward flight of the UAV 1 relative to the balloon 16 when the UAV has reached an angle of approximately 45° to the horizontal. The process continues until the UAV has been brought up to a horizontal attitude, or nearly so, when it is released from the tether 14 and permitted to assume free flight.

The purpose of the mass 17 within the tether 14 is to define a relatively stable anchor point about which the UAV 1 can fly in the course of its transition from the FIG. 4 condition to the horizontal or near horizontal attitude in which it is ready to be released from the tether. Nevertheless it will be appreciated that the tendency of the UAV flying around the balloon on its tether will be to pull the balloon around in an arcuate path, albeit of much reduced radius compared to the path of the UAV and lagging behind it by several degrees. The tendency of this pull on the UAV itself is to yaw it inwards towards the centre of its arc, although this tendency can be corrected by positioning the point of attachment of the tether 14 to the UAV to lie slightly behind the centre of gravity 18 of the vehicle (e.g. at the position indicated at 19 in FIG. 4) and/or by the application of opposite "rudder" (differential tail plane) control. It will also be appreciated that as the UAV develops increasing amounts of lift in its flight around the balloon and supports an increasing proportion of its own weight the effect is to relieve the weight on the balloon and the tendency would therefore be for the balloon to rise. If permitted to do so it could prevent the UAV from reaching the horizontal or near horizontal attitude in which it is ready to be released so the tendency is corrected by the controlled venting of gas from the balloon.

The attitude of the UAV is monitored throughout this phase of the launch procedure and its power, flying controls and the balloon buoyancy are controlled as required to ensure that it reaches the requisite conditions of airspeed and attitude for release from the tether. To this end both the UAV 1 and the balloon 16 may be equipped with GPS receivers with telemetry links to the ground and the attitude of the UAV determined from the relative altitudes of the two vehicles, and/or the balloon may carry a video camera through which the UAV can be observed.

The main length of the tether 14 may be made of any suitable material such as Kevlar® or Spectra® but to effect its release when required it may incorporate at least a link of polyethylene or other fusible rope (e.g. Spectra®) at the attachment to the UAV, around which a heating element is wound. When the signal is given to release, the heating element is energised and melts the link.

After the UAV 1 has been released, the balloon 16 may be fully vented and safely returned to the ground for recovery by an onboard parachute. If eventually the UAV is to be recovered, it may be "dethermalised" (wing 3 fully stalled) and flown to the ground with directional control provided by differential operation of the tail planes. This reduces flight loads during descent, provides a more rapid controlled descent at a slower airspeed than conventional gliding flight and avoids the weight penalty of the UAV carrying a recovery parachute.

It will be appreciated from the foregoing description that the procedure for launching the UAV 1 to its operational stratospheric altitude does not require that it is flown up through the troposphere under its own power but rather is supported in its passage through the troposphere by the balloon 16. On the other hand the transition to free flight once the balloon has carried it to altitude is accomplished under its own power in a gradual and controlled manner without any free-fall drop from the balloon. It follows that the airframe can be lighter than one which is designed to cater for the aerodynamic loads imposed by tropospheric flight or a recovery from a free fall, with a corresponding increase in the payload which can be carried.

Although it will usually be the case that the UAV is raised by the balloon suspended in the attitude indicated in FIG. 4, it is within the scope of the invention for it to be raised in a different attitude and transitioned to the FIG. 4 attitude for the commencement of its powered phase. It is also within the scope of the invention for the UAV to be raised on a shorter tether than that required for its transition to free flight and for the tether to be payed out as required for the commencement of its powered phase.

The invention claimed is:

1. A method of launching a heavier-than-air air vehicle comprising at least an aerodynamic lifting surface and thrust-producing powerplant, the method comprising: raising the heavier-than-air vehicle to a desired altitude by means of a lighter-than-air vehicle; when said desired altitude has been reached, operating said powerplant to produce thrust with the heavier-than-air vehicle suspended at a high bank angle below the lighter-than-air vehicle by means of a tether attached to said lifting surface of the heavier-than-air vehicle at a substantially outboard position thereof, causing the tethered heavier-than-air vehicle to describe an upwardly-spiralling path relative to the lighter-than-air vehicle; and releasing said tether to permit free flight of the heavier-than-air vehicle when the latter has reached a desired attitude; wherein the heavier-than-air vehicle is initially supported by a pivotable structure in a substantially level attitude; said structure is pivoted to place the heavier-than-air vehicle in a substantially 90° banked attitude; and the heavier-than-air vehicle is released from said structure while tethered to the lighter-than-air vehicle to be raised as aforesaid.

2. A method according to claim 1 wherein the lighter-than-air vehicle is attached to said structure to cause or assist the same to be pivoted as aforesaid.

3. A method according to claim 1 wherein the position of attachment of said tether to the heavier-than-air vehicle is aft of the centre of gravity of such vehicle.

4. A method according to claim 1 wherein gas is caused to be vented from the lighter-than-air vehicle during the course of the heavier-than-air vehicle describing said upwardly-spiralling path, so as to correct for increasing development of lift by the heavier-than-air vehicle.

5. A method according to claim 1 wherein a mass is incorporated within said tether to define a position about which the heavier-than-air vehicle describes said upwardly-spiralling path.

6. A method of launching a heavier-than-air air vehicle comprising at least an aerodynamic lifting surface and thrust-producing powerplant, the method comprising: raising the heavier-than-air vehicle to a desired altitude by means of a lighter-than-air vehicle; when said desired altitude has been reached, operating said powerplant to produce thrust with the heavier-than-air vehicle suspended at a high bank angle below the lighter-than-air vehicle by means of a tether attached to said lifting surface of the heavier-than-air vehicle at a substantially outboard position thereof, causing the tethered heavier-than-air vehicle to describe an upwardly-spiralling path relative to the lighter-than-air vehicle; and releasing said tether to permit free flight of the heavier-than-air vehicle when the latter has reached a desired attitude; wherein the heavier-than-air vehicle has pitch control means which are caused to be in a pitch down condition at the commencement of said operation of said powerplant.

7. A method according to claim 6 wherein the position of attachment of said tether to the heavier-than-air vehicle is aft of the centre of gravity of such vehicle.

8. A method according to claim 6 wherein gas is caused to be vented from the lighter-than-air vehicle during the course of the heavier-than-air vehicle describing said upwardly-spiralling path, so as to correct for increasing development of lift by the heavier-than-air vehicle.

9. A method according to claim 6 wherein a mass is incorporated within said tether to define a position about which the heavier-than-air vehicle describes said upwardly-spiralling path.

10. A method of launching a heavier-than-air air vehicle comprising at least an aerodynamic lifting surface and thrust-producing powerplant, the method comprising: raising the heavier-than-air vehicle to a desired altitude by means of a lighter-than-air vehicle; when said desired altitude has been reached, operating said powerplant to produce thrust with the heavier-than-air vehicle suspended at a high bank angle below the lighter-than-air vehicle by means of a tether attached to said lifting surface of the heavier-than-air vehicle at a substantially outboard position thereof, causing the tethered heavier-than-air vehicle to describe an upwardly-spiralling path relative to the lighter-than-air vehicle: and releasing said tether to permit free flight of the heavier-than-air vehicle when the latter has reached a desired attitude; wherein the heavier-than-air vehicle has yaw control means which are caused to be in a condition tending to yaw the vehicle opposite to its attachment to said tether during the course of it describing said upwardly-spiralling path.

11. A method according to claim 10 wherein the position of attachment of said tether to the heavier-than-air vehicle is aft of the centre of gravity of such vehicle.

12. A method according to claim 10 wherein gas is caused to be vented from the lighter-than-air vehicle during the course of the heavier-than-air vehicle describing said upwardly-spiralling path, so as to correct for increasing development of lift by the heavier-than-air vehicle.

13. A method according to claim 10 wherein a mass is incorporated within said tether to define a position about which the heavier-than-air vehicle describes said upwardly-spiralling path.

14. A method of launching a heavier-than-air air vehicle comprising at least an aerodynamic lifting surface and thrust-producing powerplant, the method comprising: raising the heavier-than-air vehicle to a desired altitude by means of a lighter-than-air vehicle; when said desired altitude has been reached, operating said powerplant to produce thrust with the heavier-than-air vehicle suspended at a high bank angle below the lighter-than-air vehicle by means of a tether attached to said lifting surface of the heavier-than-air vehicle at a substantially outboard position thereof, causing the tethered heavier-than-air vehicle to describe an upwardly-spiralling path relative to the lighter-than-air vehicle; and releasing said tether to permit free flight of the heavier-than-air vehicle when the latter has reached a desired attitude; wherein said tether includes a length of fusible material adjacent to its attachment to the heavier-than-air vehicle and the heavier-than-air vehicle includes heating means for melting the same to release the tether.

15. A method according to claim 14 wherein the position of attachment of said tether to the heavier-than-air vehicle is aft of the centre of gravity of such vehicle.

16. A method according to claim 14 wherein gas is caused to be vented from the lighter-than-air vehicle during the course of the heavier-than-air vehicle describing said upwardly-spiralling path, so as to correct for increasing development of lift by the heavier-than-air vehicle.

17. A method according to claim 14 wherein a mass is incorporated within said tether to define a position about which the heavier-than-air vehicle describes said upwardly-spiralling path.

* * * * *